Oct. 31, 1933.                M. BERMAN                1,933,409
                           RADIATOR FILTER
                        Filed Feb. 15, 1933          2 Sheets-Sheet 1
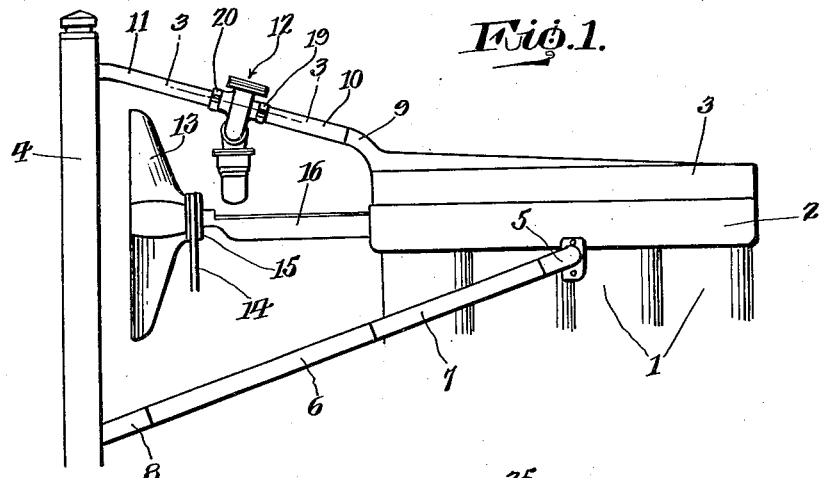
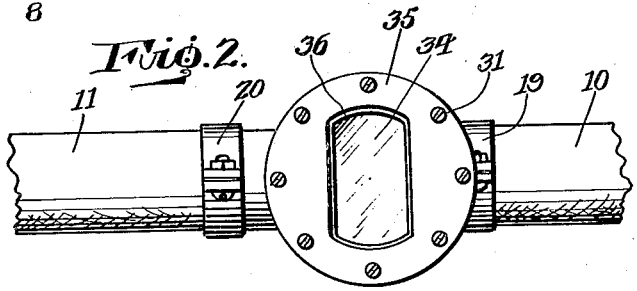
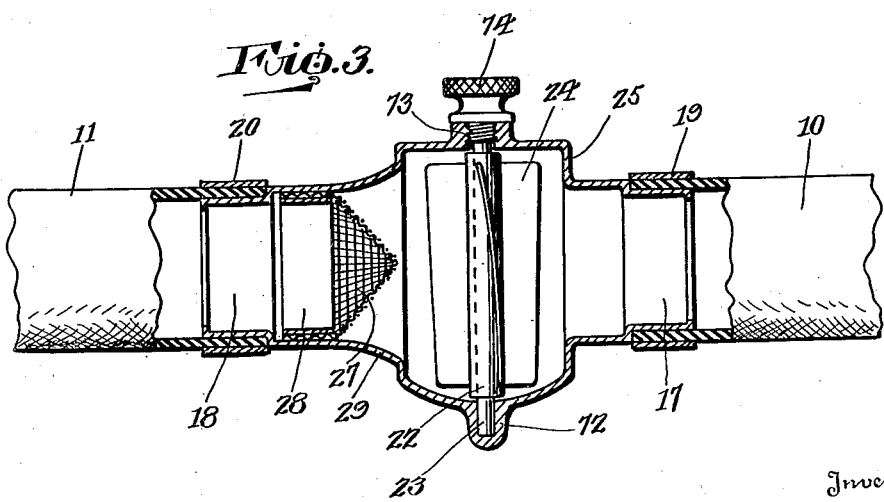
Inventor
*Morris Berman*
By *Geo. P. Kimmel*
            Attorney Oct. 31, 1933.    M. BERMAN    1,933,409
RADIATOR FILTER
Filed Feb. 15, 1933    2 Sheets-Sheet 2
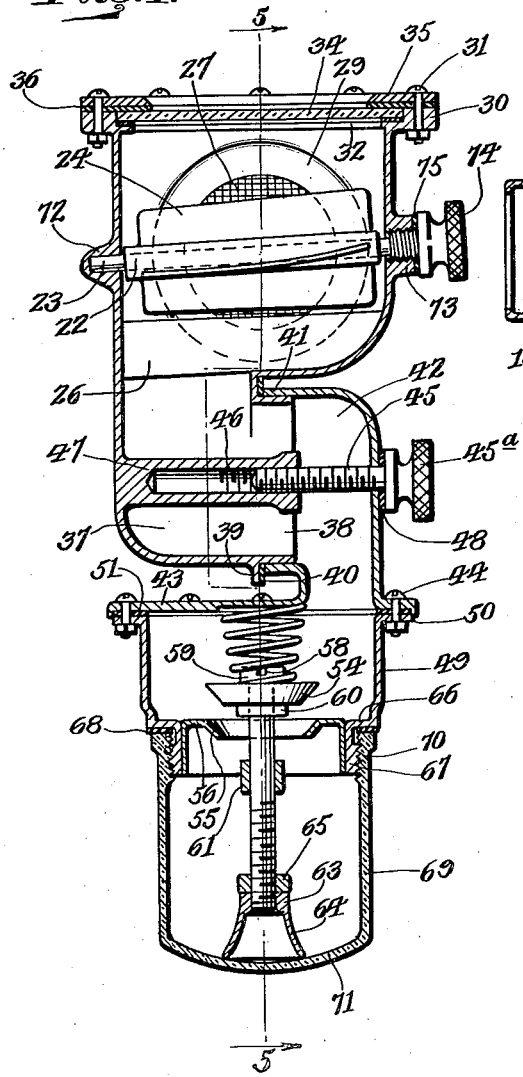
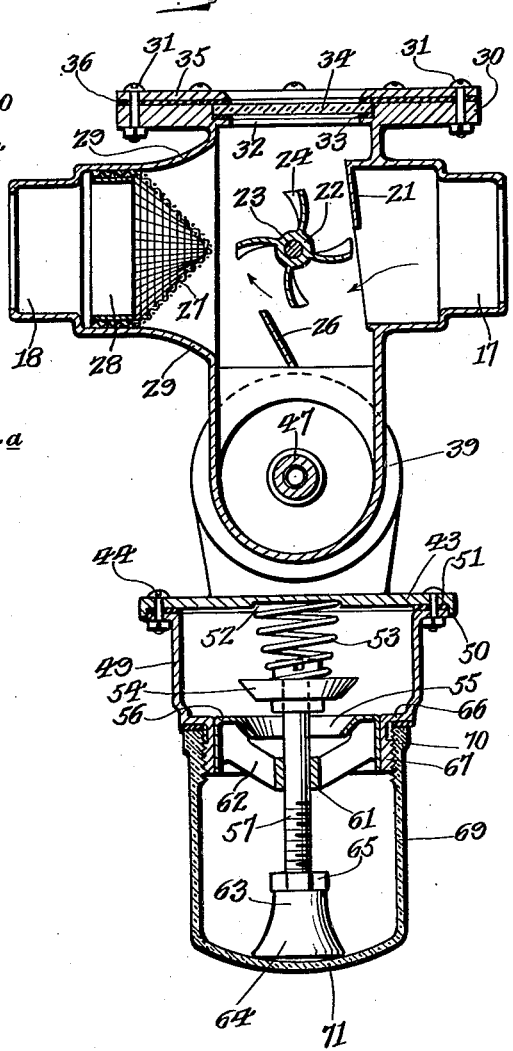
Inventor
Morris Berman
By Geo. P. Kimmel
Attorney Patented Oct. 31, 1933

1,933,409

UNITED STATES PATENT OFFICE 1,933,409

RADIATOR FILTER

Morris Berman, Norwich, Conn.

Application February 15, 1933. Serial No. 656,940

8 Claims. (Cl. 210—165)

This invention relates in general to radiator filters, and more particularly has reference to a device for filtering and separating the dirt, rust and other foreign particles from the fluid in automotive cooling systems prior to its entrance into the radiator.

As is well known, fluids used in automotive vehicles, and especially those used for cooling the engine in what is commonly known as the radiator system, are forced through the system by means of pumps. These cause the fluid to continually circulate in the well known manner and results in a cooling effect on the engine. In its course through the system through which it is forced, the fluid picks up and carries along particles of dust, dirt and rust. These clog the system in whole or in part with a resulting loss in the efficiency of the device. To remedy this defect in the fluid system this invention has been designed.

Various arrangements have been previously devised for filtering and separating foreign particles out of the cooling fluid in automobiles, but these have in the main depended on the mere passage of the fluid through a screen, the action of the screen being assisted in certain instances by baffle arrangements. However, as will be appreciated, the mere use of a screen for passing a fluid therethrough is very inefficient both because the screen is likely to become clogged within a very short time, and also because there is always the force of the water passing through the screen tending to carry the smaller particles on through and thus defeat the purpose of the device. Where stationary baffles have been used, the extent to which they improve on the use of the screen alone is questionable, because they merely change the direction of flow through the screen, leaving it to the screen as before to separate the foreign particles from the fluid.

It is therefore the object of this invention to provide a device in which the fluid is given a motion which will of itself tend to separate the foreign particles from the fluid and deposit them in a receptacle provided for the purpose. After this takes place, the fluid is then passed through a screen which merely serves the purpose of catching any stray particles that may have gotten past the principal separating stage. Provision is also made in the present invention for removing the receptacle which is adapted to receive the dirt or other foreign particles and empty the same without the necessity of draining the fluid from the cooling system.

This is naturally of considerable importance because frequently, as in the winter time, these cooling systems are filled with more or less expensive fluids for the purpose of preventing them from freezing, and in draining the fluids from the radiator cooling systems there is always a more or less loss.

Another feature of this invention resides in the provision of a means whereby the receptacle for the dirt and other foreign particles is made adjustable with respect to the remainder of the device, so that it will always be positioned downwardly with respect to the rest of the structure, and will be itself in the proper vertical position to assure its most efficient operation.

Other objects and advantages of this invention will become apparent from the following description taken in connection with the accompanying drawings, it being distinctly understood that the same are by way of illustration and example only and are not to be taken as in any way limiting the scope of this invention. This invention is to be limited in scope only by the prior art and the terms of the appended claims.

Referring now more particularly to the drawings in which like numerals indicate corresponding parts throughout:—

Figure 1 is a side view illustrating a radiator cooling system and showing the application of this invention.

Figure 2 is a plan view of the device of this invention as illustrated in Figure 1.

Figure 3 is a partial sectional view taken along the line 3—3 of Figure 1.

Figure 4 is a transverse vertical sectional view taken through the device of this invention.

Figure 5 is a sectional view taken along the line 5—5 of Figure 4.

The numeral 1 in Figure 1 indicates the cylinders of an automotive engine of the type commonly in use, the numeral 2 indicating the cooling jackets surrounding the upper portions of the same, and the numeral 3 indicating the cylinder head through which the cooling fluid is also adapted to circulate. The radiator 4 which is here diagrammatically illustrated and which is adapted to cool the liquid as it is circulated through the cooling system is connected at its lower end to the cooling jacket 2 by means of fitting 5, a short length of pipe 6, and a pair of flexible hose connections 7 and 8. At its upper end, the radiator is connected with the opening 9 at the forward end of the block 3 by means of hose connections 10 and 11 between which are mounted the device of this invention, generally indicated at 12. The customary fan 13 is mounted on a bracket just to the rear of the radiator 4 and is actuated from the crank shaft of the engine by means of the belt 14 passing over the pulley 15. This fan as is well known, serves to draw air through the radiator and thus cool the fluid as it is passing downward therethrough to be returned to the engine. The shaft carrying the fan 13 may extend back through the bracket 16 upon which the fan is mounted and operates a pump at its rear end for the purpose of propelling the fluid through the system. In case no pump is provided the fluid circulates through the system by being heated in the jacket 2 and the cylinder head 3. This heating causes the fluid in this portion of the cooling system to expand and rise flowing through the upper hose connection in the top part of the radiator. It then passes down through the radiator where it is cooled and contracted and back up through the lower hose connection into the sleeve again to further cool the engine.

Referring now to Figures 3 to 5 inclusive, it will be seen that this invention consists of an upper housing, a lower housing, and a valve chamber and a sediment bulb. The upper housing is provided with an intake fitting 17 and an outlet fitting 18 for the purpose of receiving the ends of the hose connections 10 and 11 which are secured to these fittings by means of the hose clamps 19 and 20 respectively. As will be seen in Figure 5, the intake opening which communicates with the intake fitting 17 is closed along its upper portion by means of a baffle wall 21 which causes the fluid to be directed against the lower side of the small impeller wheel 22 mounted on a shaft 23 and carrying impeller blades 24. This impeller wheel extends substantially all the way across the upper housing as illustrated in Figure 3, and is arranged to turn freely upon its axis. The upper housing member is arranged with a cylinder-like formation 25 for the purpose of accommodating the impeller wheel 22.

At the lower side of this impeller wheel and substantially across the center of the upper housing is a second baffle wall 26 which is somewhat inclined in the direction in which the impeller wheel is adapted to turn.

Arranged within the outlet opening adjacent the outlet fitting 18 is a conical-shaped screen 27 with its apex turned toward the interior of the device, the same being secured in place by means of a ring 28 which wedges it securely in place within the outlet opening. The walls of the upper housing where they lead to the outlet opening are rounded away as illustrated at 29 so as to more readily enable the fluid to pass out of the outlet opening.

As illustrated, the upper end of the upper housing member is provided with a laterally extending flange 30 having openings therethrough for the purpose of receiving the bolts 31. This top portion is provided with an opening 32 therethrough within which is formed a shoulder adapted to receive the gasket member 33 and the glass window 34. For the purpose of holding this glass window in place there is a ring 35 having an opening therein substantially the size of the opening 32, and secured to the flange 30 by means of the bolts 31. A gasket member 36 is preferably provided between the ring 35 and the flange 30 for the purpose of preventing any possible leakage.

The lower end of the upper housing member is reduced in size to substantially half the cross section of its upper portion as will be clearly seen from an inspection of Figure 4. It is then formed into the shape of an elbow 37 having a circular outlet opening 38. Around the outer sides of this outlet opening 38 there is provided a flange 39 carrying a circular gasket 40 adapted to receive the open end 41 of the lower housing. This end 41 of the lower housing is shaped to exactly fit around the end 38 of the upper housing and to form a fluid tight seal therewith by virtue of the gasket 40. This lower housing is formed with an elbow 42 similar to the previously described elbow 37 of the upper housing, and terminates at its lower end in a laterally extending circular flange 43 having openings therein for the purpose of receiving the bolts 44. This lower housing member is held in place with respect to the upper housing member by means of a screw 45 actuated by a knurled head 45a and engaging with the threaded opening 46 in the lug 47 extending from the interior of the upper housing. The screw member 45 passes through an opening provided in the lower housing in such position that it coincides with the center line of the opening 38 at the lower end of the upper housing. The lug 47 is likewise positioned so that it extends centrally of this opening, and it will be seen that by virtue of this arrangement, the lower housing may be swung or hinged with respect to the upper housing by merely loosening the threaded member 45 by means of the knurled head 45a. This knurled head 45a is adapted to bear against a gasket member 48 in order to prevent leakage from the lower housing.

As above stated, the flange 43 of the lower housing member is provided with a series of marginal openings for the purpose of receiving the bolts 44. The valve housing 49 is likewise provided with a circular flange 50 having a series of openings corresponding to the openings in the flange 43, whereby the flanges 43 and 50 may be secured together by means of the bolts 44. Positioned between these flanges for the purpose of preventing leakage there is provided a gasket member 51.

As will be seen from the drawings, the flange 43 is recessed slightly at 52 for the purpose of receiving the upper end of the valve spring 53. This valve spring 53 bears at its lower end against the upper side of the valve 54 tending to force the same against the valve seat 55 formed in the valve seat member 56. This valve seat member 56 is secured by soldering or some other suitable means within the lower end of the valve chamber or valve housing 49.

The valve 54 is provided with a valve stem 57 which may be secured to it in any suitable manner as shown. In the illustration, the valve stem 57 comprises a bolt having a slot 58 at one end adapted to receive a screw driver or similar tool. This slot is formed in the bolt head 59 which rests against the upper side of the valve 54. The bolt 57 is provided on the lower side of the valve 54 with a ring 60 for the purpose of maintaining the valve stem in proper position with respect to the valve. This valve stem is supported in a bearing 61 carried by the arms 62 which in turn are secured to the valve seat member 56. Thus a positive guide for the valve stem 57 and the valve 54 is provided.

At the lower end of the valve stem, it is provided with a threaded portion carrying a nut 63, said nut being so formed as to provide a downwardly extending portion 64 adapted to extend beyond the end of the stem 57 for a purpose to be hereinafter described. This nut 63 is of course adjustable on the threaded portion of the stem 57, and may be locked in place by means of the lock nut 65.

The lower end of the valve chamber within which the valve seat member 56 is secured is provided with a shouldered portion 66 and a downwardly extending threaded portion 67. A gasket 68 is positioned against the shouldered portion 66, the lower end of the valve housing being thus arranged to receive the upper end of the sediment bulb 69 which is internally threaded at 70 for engagement with the threaded portion 67 of the valve housing. As will be seen, when this member 69 is secured in place, its upper edge will bear against the gasket 68 and form a fluid tight joint. It will be further seen that when the sediment bulb 69 is thus secured in place its bottom portion 71 will be forced into contact with the downwardly extending part 64 of the nut 63, and that the valve 54 will thus be forced from its seat against the compression of the spring 53.

It is believed that the operation of this invention will be clearly apparent from the foregoing description. However, its operation may be briefly described as follows:

The cooling fluid enters this device through the inlet opening 17, and is caused by the baffle 21 to impinge against the lower portion of the impeller wheel 22 thus causing the same to rotate at a very rapid rate. By virtue of the rotation of the impeller wheel 22 the fluid within the upper part of the upper housing will be continuously thrown about with great turbulence, and its forward motion through the system will be temporarily interrupted. Some of the fluid will be deflected by means of the baffle 26 into the lower part of the upper housing, and will thereby be caused to circulate through that portion of the housing before leaving the fluid filter. By virtue of all this turbulence and temporary halting of the forward motion of the fluid, the dirt, rust, and other foreign particles will be caused to settle toward the bottom of the device, passing downwardly through the opening 38 into the valve chamber 49, from which they will go past the valve 54 into the sediment bulb 69 which is preferably made of glass or other transparent material. After the sediment has thus been separated from the fluid by means of the mechanism located in the upper portion of the device, the fluid is then passed outwardly through the screen member 27 at the outlet fitting or opening 18. The screen member 27 is adapted to retain any of the sediment or dirt which has not been fully removed by means of the mechanism previously described. It is noted that in addition to causing turbulence in the fluid and thus tending to separate the sediment from the fluid, the impeller wheel also causes a considerable turbulence immediately adjacent the filter or screen 27 thus tending to keep it free from sediment which might otherwise clog it up.

The glass plate 34 is provided in the upper opening 32 for the purpose of allowing inspection of the interior of the device while it is in operation, and it will thus be seen that any failure of the device to properly function may be readily detected. This will also serve as an indication of whether the pump for the cooling system is working or not, because if this pump fails to work then the impeller wheel 22 will not rotate.

When the sediment bulb 69 has become filled or partly filled with sediment, this condition can be easily detected through the transparent wall of the sediment bulb, and the bulb may then be removed and emptied. It will be readily apparent that when the bulb is to be removed for the purpose of emptying it, it will not be necessary to drain the system of fluid because of the fact that when the bulb is removed it will allow the spring 53 to force the valve 54 downwardly against its seat 55 thus preventing the fluid from escaping while the sediment bulb is removed.

With further reference to the impeller wheel 22, it has been noted that this wheel is mounted on a shaft 23 so that it may revolve freely upon the same. It is further noted that this impeller wheel is slightly smaller at one end than at the other, and that the vanes 24 are somewhat curved. All this is for the purpose of introducing a great amount of turbulence and hence a greater tendency for the fluid and the sediment to separate while passing through this device. The shaft 23 may be mounted in the upper housing in any suitable manner. In the present instance, one end of the shaft 23 rests in a bearing portion 72 formed in the housing member, the other end being formed with threads for engaging the interiorly threaded portion 73 in the opposite side of the housing. A knurled head 74 is provided on this shaft for properly putting it in place, and a gasket 75 is provided for the purpose of preventing leakage between the head 74 and the internally threaded portion 73.

From the above, it will be seen that a means has been provided for carrying out all the objects of this invention, and that numerous advantages have been gained by the novel construction thereof. The device as described will very effectively remove the sediment from the cooling fluid of automobile systems, and will cause it to be deposited in a sediment bulb from which it may be removed without the necessity of draining the fluid. Means has been provided whereby the operation of the device may be very carefully watched, and in the event that it ceases to operate this fact can be easily detected. It is further apparent that by virtue of the fact that the lower portion of this device is hinged with respect to the upper portion, that the same may be swung about the upper portion so that the sediment bulb 69 may always retain its vertical position as illustrated in Figure 1. The entire assembly represents a combination possessing new and advantageous features for the purpose of efficiently carrying out the function of separating the sediment from the cooling fluid in automobile systems, as will be clearly apparent to anyone skilled in the art.

What I claim is:—

1. In a device of the character described, a housing having an intake opening therein, an impeller wheel rotatably mounted in said housing and extending in a normally horizontal direction transversely of said intake opening, a baffle wall partly closing said intake opening to direct incoming fluid against the lower part of said impeller wheel, a baffle wall below and parallel to the axis of said impeller wheel and having its upper edge inclined away from said intake opening, said housing having a downwardly extending reduced portion terminating in an end having a circular opening whose axis is substantially parallel to the axis of said impeller wheel, a flange surrounding said end and spaced slightly from said opening, a gasket surrounding said end and disposed against said flange, a second housing member having an open end adapted to fit over the open end of said first housing member and engage said gasket on said flange, means securing said housing members together but allowing them to be rotated with respect to each other about the axis of said openings, said second mentioned housing having a downwardly extending part, a valve housing secured thereto and communicating therewith, said valve housing having an opening in the lower side thereof, a valve adapted to close said opening, resilient means urging said valve toward closed position, a member extending downwardly from said valve through said opening, a transparent sediment chamber detachably secured to said valve housing around said opening, said downwardly extending member being of such extent that when said sediment chamber is secured in place it will be forced upwardly by contact with the sediment chamber to unseat said valve against the tension of said resilient means, said first mentioned housing having an outlet opening substantially opposite said intake opening, and a conical filter member disposed within said outlet opening with its apex disposed inwardly of the housing, said first housing also having an opening adjacent said impeller wheel to provide for inspection thereof, and transparent means closing said opening.

2. In a device of the character described, a housing having an intake opening therein, an impeller wheel rotatably mounted in said housing and extending in a normally horizontal direction transversely of said intake opening, means for directing incoming fluid from said intake opening against the lower part of said impeller wheel, a baffle wall below and parallel to the axis of said impeller wheel and having its upper edge inclined away from said intake opening, said housing having a downwardly extending reduced portion terminating in an end having a circular opening whose axis is substantially parallel to the axis of said impeller wheel, a flange surrounding said end and spaced slightly from said opening, a gasket surrounding said end and disposed against said flange, a second housing member having an open end adapted to fit over the open end of said first housing member and engage said gasket and said flange, means securing said housing members together but allowing them to be rotated with respect to each other about the axis of said opening, said second mentioned housing having a downwardly extending part, a valve housing secured thereto and communicating therewith, said valve housing having an opening in the lower side thereof, a valve adapted to close said opening, a resilient means urging said valve toward closed position, a member extending downwardly from said valve through said opening, a transparent sediment chamber detachably secured to said valve housing around said opening, said downwardly extending member being of such extent that when said sediment chamber is secured in place it will be forced upwardly by contact with the sediment chamber to unseat said valve against the tension of said resilient means, said first mentioned housing having an outlet opening substantially opposite said intake opening, and a conical filter member disposed within said outlet opening with its apex disposed inwardly of the housing, said first housing also having an opening adjacent said impeller wheel to provide for inspection thereof, and transparent means closing said opening.

3. In a device of the character described, a housing having an intake opening on one side thereof and an outlet opening on the opposite side thereof, an impeller wheel rotatably mounted in said housing and extending transversely of said intake opening, said intake opening being so arranged with respect to said impeller wheel that incoming fluid will be directed against the lower part of said impeller wheel, a baffle wall below and parallel to the axis of said impeller wheel and having its upper edge inclined away from said intake opening, said housing having a downwardly extending portion below said baffle, said portion terminating in a circular opening whose axis is substantially parallel to the axis of said impeller wheel, a second housing member having an open end adapted to fit over the open end of said first housing member and form a rotatable leakproof joint therewith, means securing said housing members together but allowing them to be rotated with respect to each other about the axis of said opening, said second mentioned housing having a downwardly extending part, a valve housing secured thereto and communicating therewith, said valve housing having an opening in the lower side thereof, a valve adapted to close said opening, resilient means urging said valve toward closed position, a member extending downwardly from said valve through said opening, a transparent sediment chamber detachably secured to said valve housing around said opening, said downwardly extending member being of such extent that when said sediment chamber is secured in place it will be forced upwardly by contact with the sediment chamber to unseat said valve against the tension of said resilient means, and a conical filter member disposed within said outlet opening in said first mentioned housing.

4. In a device of the character described, a housing having an intake opening and an outlet opening therein, an impeller wheel rotatably mounted in said housing and extending transversely of said intake opening, said intake opening being so disposed with respect to said impeller wheel as to direct incoming fluid against the lower part of said wheel, said housing having a downwardly extending portion, a sediment chamber in communication therewith, and means hingedly connecting the said sediment chamber with said downwardly extending portion of the housing.

5. In a device of the character described, a housing having an intake opening and an outlet opening therein, an impeller wheel rotatably mounted in said housing and having its axis extended transversely of the axis of said intake opening and so positioned that incoming fluid through said intake opening will be directed against the lower part of said impeller wheel, said housing having a downwardly extending portion, a baffle adjacent the lower portion of said impeller wheel adapted to divert matter thrown off by said wheel into said downwardly extending portion, a sediment chamber communicating with said downwardly extending portion of said housing, a valve adapted to close the opening between said housing and said sediment chamber, means normally urging said valve to closed position to separate said housing from said sediment chamber, and means coacting with said sediment chamber for forcing said valve to open position when said sediment chamber is secured in place.

6. In a device of the character described, a housing having an intake opening and an outlet opening therein, a filter member mounted in said outlet opening, rotatable means mounted in said housing adjacent said filter and having its axis extending transversely of the axis of said intake opening and adapted to be rotated when fluid is forced through said device to cause turbulence in the fluid immediately adjacent said filter member, and a sediment chamber in communication with the lower part of said housing, and a baffle adjacent the lower portion of said rotatable means adapted to divert matter thrown off by said rotatable means into said sediment chamber.

7. In a device of the character described, a housing having an intake opening and an outlet opening therein, means within said housing for removing sediment from fluid passing through said device, a sediment chamber, and means hingedly connecting said sediment chamber to the lower portion of said housing for pivotal movement about a normally horizontal axis.

8. In a device of the character described, a housing having an intake opening and an outlet opening therein, means within said housing for removing sediment from fluid passing therethrough, said housing having a downwardly extending reduced portion terminating in an end having a circular opening whose axis is normally substantially horizontal, a flange surrounding said end and spaced slightly from said opening, a gasket surrounding said end and disposed against said flange, a second housing member having an open end adapted to fit over the open end of said first housing member and engage said gasket on said flange, means securing said housing members together but allowing them to be rotated with respect to each other about the axis of said opening, and a sediment chamber communicating with said second housing member.

MORRIS BERMAN.